United States Patent [19]

Moyers

[11] 4,414,773

[45] Nov. 15, 1983

[54] SAFETY DEVICE FOR ANIMAL TRAP

[76] Inventor: Thomas L. Moyers, 2370 Sunset Strip, Mountain Home, Id. 83647

[21] Appl. No.: 261,486

[22] Filed: May 7, 1981

[51] Int. Cl.³ ............................................ A01M 23/28
[52] U.S. Cl. ...................................................... 43/97
[58] Field of Search ................... 43/81.5, 83.5, 95, 96, 43/97

[56] References Cited

U.S. PATENT DOCUMENTS

| | | | |
|---|---|---|---|
| 3,411,234 | 11/1968 | Harrison | 43/97 |
| 4,115,945 | 9/1978 | Hession | 43/97 |
| 4,230,355 | 10/1980 | Petrunich | 43/96 |

*Primary Examiner*—Nicholas P. Godici
*Assistant Examiner*—Marc Hodak

*Attorney, Agent, or Firm*—Shlesinger, Arkwright, Garvey & Fado

[57] ABSTRACT

A safety device for positioning animal traps of the rotating frame type having spring actuated jaws, the device including a trap-engaging body portion connected to a handle, stationary retaining members extending from the body portion, the device being movable to operatively engage the retaining members with the trap jaws to maintain the latter in the open or set position while the trap is being positioned for use. One or more pins extend outwardly from the body portion in predetermined relationship to the retaining members and trap jaws for preventing accidental disengagement of the device from the trap, the pin or pins being retractable to permit installation and removal of the safety device from the trap.

16 Claims, 11 Drawing Figures

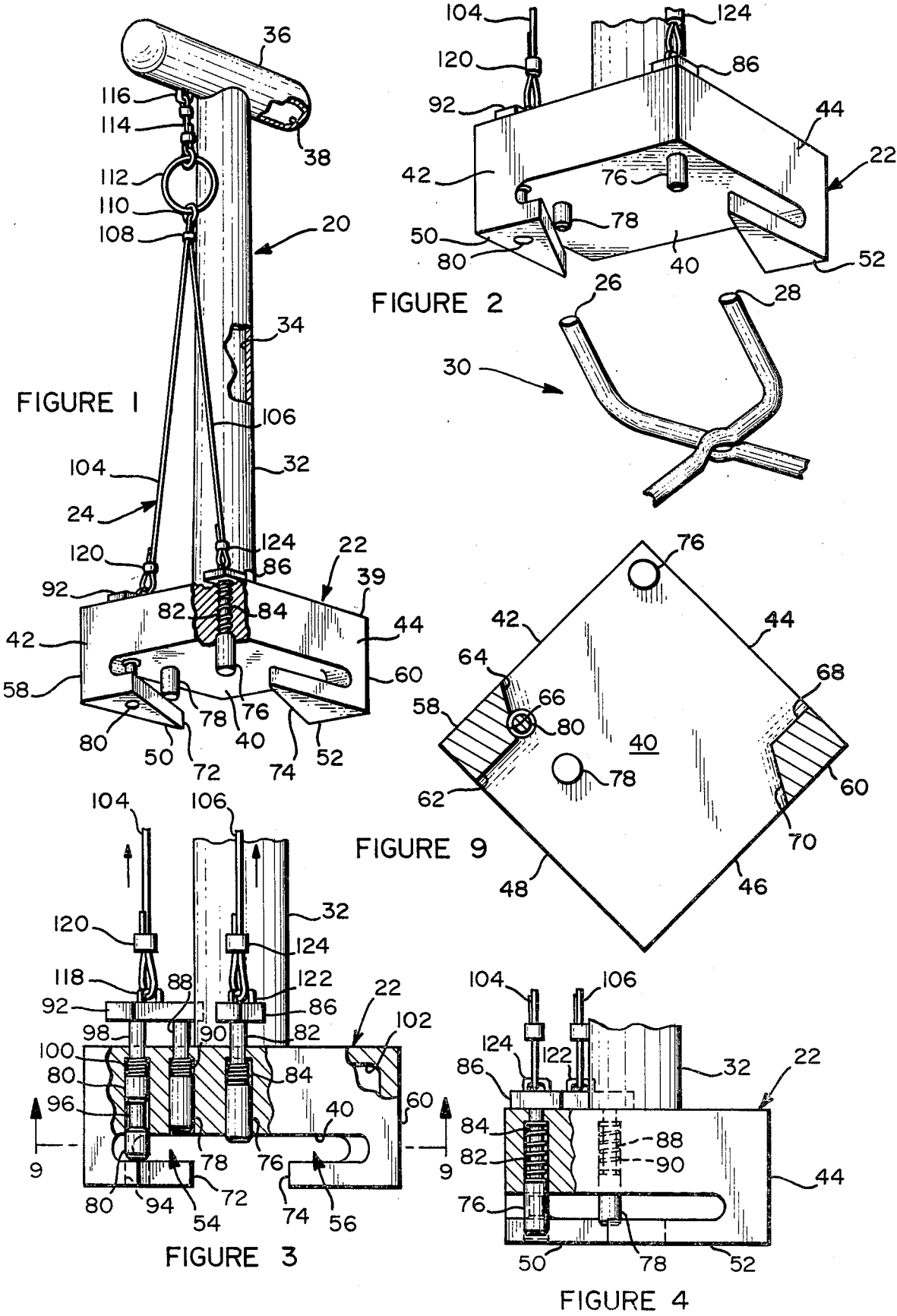

FIGURE 5
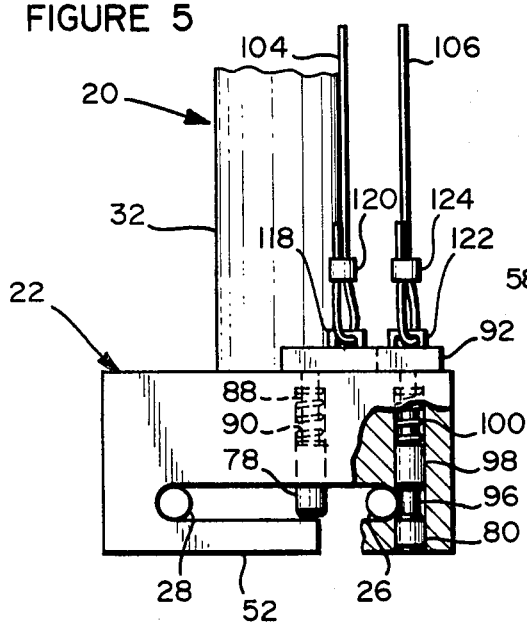
FIGURE 6
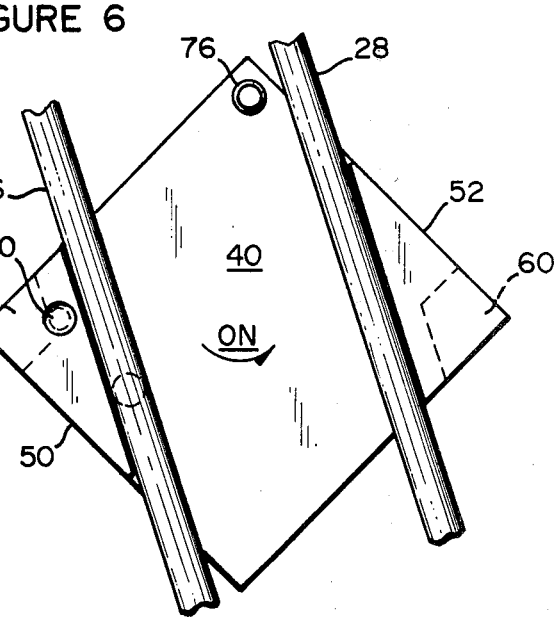
FIGURE 7
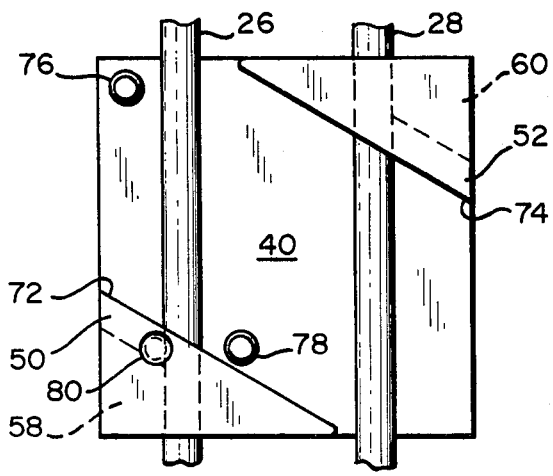
FIGURE 8
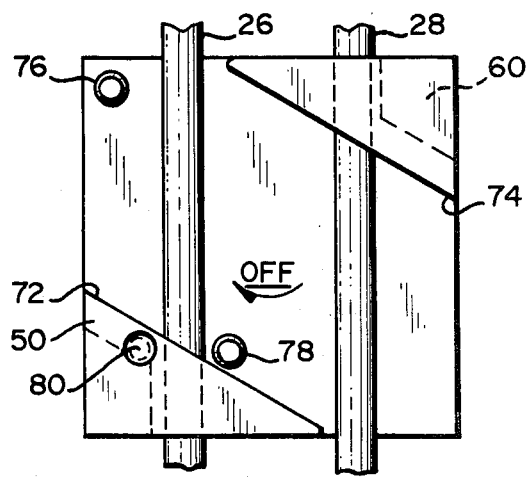
FIGURE 10
FIGURE 11

SAFETY DEVICE FOR ANIMAL TRAP

BACKGROUND OF THE INVENTION

This invention relates to a safety device for use in positioning animal traps of the rotating frame type, which device is readily installed and removed from the trap jaws without placing the hand or fingrs in contact with, or in close proximity to, the trap.

Conibear, or rotating frame type traps, such as disclosed in U.S. Pat. No. 3,010,245, are extensively used for trapping beaver, otter and other animals. These powerful traps generally comprise a pair of frames or jaws made of heavy gauge round wire stock which are pivotally connected to each other on a common axis to form two pairs of coacting jaws. A strong spring is connected to the jaw pairs for urging the latter to a closed position. A trigger holds the spring loaded jaw pairs in a set or open position, the jaw pairs snapping closed by spring action when the trigger is moved or jarred.

This type of trap is extremely dangerous to the trapper since, if the trap closes unexpectedly while being handled or placed in position, serious injury to the hands, arms, feet, or legs of the trapper can result. This danger is accentuated when positioning the trap under water.

In order to reduce the danger inherent in handling these traps, a few safety devices have been developed including the use of two positioned triggers which provide a safety means for holding the trap in set position. However, the trapper must move the trigger from the safe to a set position with his hands, thereby endangering himself in the event that the trap should close during this operation.

Other such safety devices have been developed for traps of this type, but all known safety devices up to this time are an integral or attachment part of the trap which require the trapper to touch or handle the trap safety or other locking mechanism with his fingers, when he desires to remove the safety and place the trap in the set position.

SUMMARY OF THE INVENTION

The safety device of the present invention is separate and apart from the animal trap, and intended for use only during the positioning of the trap while in its set position, after which it is removed therefrom. This enables the device to be used in the setting of multiple traps, thereby obviating the necessity of the trapper positioning any traps by engaging the trap jaws directly with his hands.

The present device includes a trap-engaging body portion connected to a relatively long handle which is grasped by the trapper, the body portion including fixed and movable members for firmly engaging the set jaws of the trap, and permitting the trap to be positioned for use anywhere, including under water, without danger of accidental springing of the trap. After the trap has been positioned for use, the safety device is removed from engagement with the trap.

The fixed members connected to the body portion hold the spring actuator jaws. The movable members are in the form of retractable pins extending from the body portion which ensure engagement of the fixed members with the trap jaws, and positively prevent accidental disengagement of the fixed members and the trap jaws.

In the event that the trap is accidentally sprung after engagement by the present device, locking means are provided for preventing removal of the device from the trap jaws, which locking means are operative until the trap trigger is reset, after which the device may be removed.

The structural arrangement of the present device further prevents accidental disengagement thereof from the trap, removal requiring a combination of steps in predetermined sequence to effect removal thereof.

DESCRIPTION OF FIGURES OF THE DRAWINGS

FIG. 1 is a perspective view of the safety device of the present invention, portions thereof being broken away to disclose details of construction;

FIG. 2 is a fragmentary bottom perspective view of the present invention, showing the device positioned over a pair of jaws of a rotating frame type animal trap;

FIG. 3 is a fragmentary side elevational view of the device of the present invention, showing the pins thereof in retracted position;

FIG. 4 is a view similar to FIG. 3, but with the device rotated 45°, showing the pins in extended position;

FIG. 5 is a view similar to FIG. 4, taken from the opposite side of the device, a portion thereof being broken away to disclose details of construction;

FIG. 6 is a bottom plan view of the present device, showing the body portion thereof oriented for placement on a pair of trap jaws;

FIG. 7 is a view similar to FIG. 6, showing the device rotated approximately 45°, and with the jaw pair in tripped position;

FIG. 8 is a view similar to FIG. 7, showing the jar pair in set position;

FIG. 9 is a sectional view taken along the line 9—9 of FIG. 3, looking in the direction of the arrows;

FIG. 10 is a bottom plan view of a modified form of the present invention, and

FIG. 11 is a second modified form of the present invention.

DESCRIPTION OF FORM OF INVENTION ILLUSTRATED IN FIGS. 1 TO 9

Referring now in greater detail to the drawings, the safety device of the present invention generally includes a handle portion 20, one end of which is connected to a base or body portion 22 and a pin retracting assembly 24 extending from the far end of handle portion 20 to body portion 22. Base portion 22 is adapted for engagement with opposed parallel jaws 26, 28 of a Conibear or rotating frame type animal trap 30.

The present device is preferably constructed of a lightweight material such as ABS or urethane plastic of an irridescent yellow or orange color for high visibility purposes. Handle portion 20 includes an elongated shaft 32 which is hollow or provided with foam filled compartments 34. A hand engaging cross piece 36 is connected to one end of shaft 32 and is also provided with hollow or foam filled compartments 38. The hollow or foam filled compartments of the handle render the present device buoyant if accidentally dropped into water.

Base or body portion 22 is also preferably constructed of a lightweight material such as ABS or urethane plastic. Although base 22 may be of any suitable configuration, it is preferably of a substantially square shape including a flat top wall 39, and a flat bottom wall 40 which are separated by side walls 42, 44, 46 and 48.

In accordance with the present invention, there are provided a pair of like, flat, triangular shape retaining fingers 50 and 52 which lie in parallel, spaced relation to bottom wall 40, thereby providing jaw receiving spaces 54 and 56. Fingers 50 and 52 extend from opposed corners of the base and are preferably formed integral therewith by means of connecting sections 58 and 60 located in opposed corners of the body portion. Corner section 58 includes an inner wall 62 which is parallel to side 42 and an angular wall 64 extending between side 42 and inner wall 62, both of which walls are of arcuate conformation to complement the shape of jaws 26 and 28. It will be noted from FIG. 9 that an arcuate wall portion 66 is located at the juncture between walls 62 and 64 for purposes which will be hereinafter more fully set out.

In like manner, connecting section 60 includes an inner wall 68 and an angular wall 70 which also are of arcuate conformation.

Triangular shaped fingers 50 and 52 extend inwardly of the body portion 22 to a point where opposite, parallel walls thereof designated 72 and 74 are spaced apart a distance which is slightly larger than the distance between opposed jaws 26 and 28 of trap 30. Also, the distance between fingers 50 and 52 and bottom wall 40 is slightly larger than the diameter of jaws 26 and 28 in order to permit entry of the jaws into spaces 54 and 56.

As shown to advantage in FIGS. 1 to 5, it is a salient feature of the present invention to provide three movable pins which are carried by body portion 22 and designated 76, 78 and 80, which are located in strategically positioned recesses in bottom wall 40 which pins are adpated to normally extend downwardly below wall 40.

Pin 76 is located at a point adjacent the corner formed by the convergence of side walls 42 and 44, the upper end of which pin is reduced as indicated at 82 A convolute spring 84 around reduced portion 82 normally urges pin 76 to its fully extended position which is limited by a stop 86 connected to the upper end of reduced portion 82, which stop engages top wall 38 when pin 76 is in its fully extended position.

Pin 78 extends downwardly at a point adjacent wall 72 of finger 50, the upper end of which pin is reduced as indicated at 88. A convolute spring 90 is positioned around reduced portion 88 for normally urging pin 78 to fully extended position. The upper end of reduced portion 88 is connected to a gang type stop 92 for limiting the extension of pin 78 below bottom wall 40.

Pin 80 is substantially longer than pin 76 and 78, the lower portion of the pin extending through an opening 94 and finger 50 when the pin is in the extended position shown in FIG. 4. When in the retracted position shown in FIG. 3, pin 80 lies within jaw receiving space 54.

At a point intermediate its length, pin 80 is provided with a peripheral recess 96 which serves as a locking means to prevent removal of the device from the trap in the event that the trap is accidentally sprung.

The upper end of pin 80 is reduced as indicated at 98 and is provided with a convolute spring 100 for urging pin 80 to its fully extended position. The upper end of reduced portion 98 is connected to gang stop 92 for limiting the extension of pin 80 through body portion 22.

Body portion 22 is also provided with hollow or foam filled compartments 102 for further aiding the buoyancy of the safety device in the event that it is accidentally dropped into water.

Pin retracting assembly 24 includes flexible cables 104 and 106, the upper ends of which are joined by a connecting member 108. A loop member 110 extends from connecting member 108 to a finger engaging pin-actuating ring 112 which is connected by a linking means 114 to cross piece 36 of handle 20 as indicated at 116.

The lower end of flexible cable 104 is engaged with an inverted U-shape member 118 affixed to gang stop 92. A securing member 120 fixes the end of cable 104 to the main portion thereof at a point above member 118.

The lower end of cable 106 is engaged with an inverted U-shape member 122 which is affixed to stop 86. A connecting member for the end of cable 106 is indicated at 124.

OPERATION

In use of the safety device of the present invention for positioning animal traps, trap 30 is first set, thereby placing jaws 26 and 28 in parallel spaced relation as shown in FIG. 2. The device is then lowered over the jaws, also as shown in FIG. 2, so that the jaws are proximate, and parallel to, sides 72 and 74 of fingers 50 and 52. While the device is being lowered into position, the finger of the trapper is inserted through ring 112 and the ring lifted in the direction of cross piece 36, thereby effecting a corresponding upward movement of cables 104 and 106 to lift pin 76, 78 and 80 in unison to the position shown in FIG. 3. The safety device is lowered onto jaws 26 and 28 until the jaws are in contiguous engagement with bottom wall 40 of body portion 22.

With the pins in retracted position, the device is rotated through approximately a 45° angle in a counterclockwise direction, as shown in FIG. 6, until jaws 26 and 28 are positioned as shown in FIG. 8, at which time the jaws are proximate to, but spaced from, inner walls 62 and 68 of connecting sections 58 and 60. It will be further noted that jaws 26 and 28 then lie in jaw receiving spaces 54 and 56 between fingers 50 and 52 and bottom wall 40.

Ring 112 is then released, and pins 76, 78 and 80 are then urged into their fully extended position, as shown in FIGS. 1, 2, 4 and 5, by the action of springs 84, 90 and 100. This action locks the safety device to the jaws by virtue of the placement of the jaws between fingers 50 and 52 and bottom wall 40, and by the location of pins 76 and 78 which lie in spaced relation on opposite sides of jaw 26. The pins positively preclude any relative rotation of the automatic safety device with respect to the jaws and thereby prevent accidental disengagement of the safety device from the jaws.

After the animal trap has been positioned in the desired location, the safety device is removed by actuating pin retracting assembly 24 and then rotating the device in a clockwise direction from the position shown in FIG. 8 through an angle of approximately 45° to the position shown in FIG. 6, at which time the device may be lifted from the jaws.

In the event that the trap is accidentally sprung while the safety device is in engagement with the trap, jaw 28 moves from the position shown in FIG. 8 to the position shown in FIG. 7, with jaw 28 in engagement with inner wall 68 of connecting section 60, and jaw 26 in engagement with inner wall 62 of connecting section 58 and with peripheral recess 96 of pin 80. The location of jaw 26 in peripheral recess 96 prevents vertical movement of pin 80 in a direction to retract the same and, in view of the fact that pins 76, 78 and 80 can only be retracted in unison, all of the pins remain in the extended position. The safety device therefore is in locked engagement with jaws 26 and 28 of the animal trap.

The safety device is then unlocked from the trap by resetting the trigger of the trap, at which point jaws 26 and 28 again assume the position shown in FIG. 8 with respect to the trap, and removal is effected as set out above.

DESCRIPTION OF FORM OF INVENTION ILLUSTRATED IN FIG. 10

In FIG. 10 there is illustrated a first modified form of the present invention which is similar in construction to the form of invention illustrated in FIGS. 1 to 9, but wherein only a single pin is employed for holding the safety device in operative position on the trap jaws. In this form of the invention, parts which correspond to those in the form of invention illustrated in FIGS. 1 to 9 are designated by like, primed numbers. In this form of the invention, no means are provided for preventing removal of the device from the trap jaws by twisting or tipping the same to work the trap from beneath fingers 50' and 52' if desired. Additionally, no locking means are provided for preventing removal of the device from the trap jaws when the trap has been sprung after engagement with the device. However, in this form of the invention, the safety device will serve to hold and position the trap under normal conditions without endangering the trapper.

DESCRIPTION OF FORM OF INVENTION ILLUSTRATED IN FIG. 11

In FIG. 11 there is illustrated a second modified form of the present invention which is similar to the form of invention illustrated in FIGS. 1 to 9, but wherein two pins are employed. Portions of this form of invention which are the same as that form illustrated in FIGS. 1 to 9 are designated by like, double primed numbers.

In this form of the invention, pins 76" and 78" serve to retain the safety device in operative engagement with trap jaws 26 and 28, and will prevent the device from being removed from the jaws by twisting or tipping thereof. However, no locking pin is provided to prevent the removal of the safety device from the locking jaws in the event that the trap is accidentally sprung after the safety device is placed thereon.

Under normal conditions, however, this form of the invention is effective for positioning the trap without danger to the hunter.

It is pointed out that rotating frame type traps are made in many different sizes and the wire frames of these traps are made of various gauge wires, depending upon the size of the overall trap. The device herein shown and described is capable of engaging and positioning many different sized traps, although it is recognized that the present device may be made in different sizes to accommodate a complete range of animal traps presently on the market.

The safety device of the present invention affords simple and economic means which may be readily installed on, and removed from, animal traps of the rotating frame type, which device may be operated at a safe distance from the moving parts of the trap, thereby enabling the set traps to be positioned safely without endangering the trapper.

Although there has been herein shown and described the presently preferred forms of this invention, it is to be understood that such has been done for purposes of illustration only, and that various changes may be made within the scope of the appended claims.

What is claimed is:

1. A safety device for animal traps of the rotating frame type having parallel spring-biased jaws when the trap is in set or open position, said device including
   (a) a body portion,
   (b) a first means extending from said body portion for holding the trap jaws in set or open position, said first means including stationary members engaged with said body portion and lying in spaced relation to each other and to said body portion, whereby the trap jaws may be positioned between the spaced members and body portion,
   (c) a second means including at least one pin carried by said body portion and positioned to locate one of the jaws between a portion of said first means and said pin upon application of the device to the trap, and
   (d) means for retracting said pin into said body portion during application of the device of the trap.

2. The safety device of claim 1, with the addition of a third means joining said spaced members to said body portion.

3. The safety device of claim 2, wherein
   (a) said spaced members comprise opposed fingers of generally triangular shape, a side of one of said members lying in substantially parallel relation to a side of the other spaced member, and in spaced relation thereto whereby, upon placing the device over the trap, the jaws thereof lie between the parallel sides of the spaced members, and upon rotating the device relating to the jaws, the latter are moved to a position between the side members and body portion.

4. The safety device of claim 4, with the addition of
   (a) a second pin extending from said body portion in spaced relation to said one pin,
   (b) said one pin and second pin lying on opposite sides of one of said trap jaws when the trap is in set position, and
   (c) means for retracting said second pin during application of the device to the trap.

5. The safety device of claim 4, with the addition of
   (a) a third pin extending from said body portion through a portion of said first means, and
   (b) means for retracting said third pin during application of the device to the trap,
   (c) said third pin including locking means engageable with a trap jaw when it is accidentally sprung, to prevent removal of the device from the sprung trap.

6. The safety device of claim 5, wherein
   (a) said locking means comprises a peripheral recess in said third pin into which a jaw of the sprung trap extends, thereby preventing vertical movement of said third pin.

7. The safety device of claim 6, with the addition of
   (a) spring means for normally urging said one, second and third pins to the extended, operative position.

8. The safety device of claim 7, with the addition of
   (a) means for retracting said one, second and third pins in unison during installation and removal of the safety device from the trap.

9. The safety device of claim 8, wherein
   (a) said means for retracting said one, second and third pins comprises elongated connecting members engaged with said one, second and third pins, and (b) a finger engaging member connected to the free end of said connecting members for manipulation by the user.

10. A safety device for animal traps of the rotating frame type having parallel spring-biased jaws when the trap is in set or open position, said device including (a) a body portion having top and bottom walls, said bottom wall being substantially flat, (b) first and second stationary jaw retaining members in spaced relation to the bottom wall of said body portion, thereby providing jaw-receiving spaces between said members and the bottom wall, (c) means connecting said members to said body portion, (d) said first and second members lying in opposed, spaced relation to each other and directed inwardly of said body portion, to permit the jaws to be inserted between the members into engagement with the bottom wall of said body portion, the device then being rotated with respect to the jaws to locate the latter in the spaces between the members and the bottom wall of said body portion, (e) a first means including a first pin movably positioned in said body portion and extending downwardly from the bottom wall of said body portion adjacent one of the trap jaws for preventing relative movement of the safety device with respect to the trap jaws, (f) a second means for retracting said movable first pin into the body portion to a point above said bottom wall thereof, to permit installation and removal of the device, and (g) a third means connected to the top wall of said body portion for permitting installation and removal of the safety device at a remote point from the trap.

11. The safety device of claim 10, wherein (a) said first and second members comprise like, triangular-shaped, flat fingers having opposed walls, (b) said opposed walls being in parallel, spaced relation, the distance between said opposed walls being greater than the distance between the trap jaws to permit the jaws to pass between said fingers to install the safety device on the trap jaws.

12. The safety device of claim 10, wherein (a) said first means includes a second pin movably positioned in said body portion and extending downwardly from the bottom wall of said body portion adjacent one of said members and one of the trap jaws for preventing relative movement of the safety device with respect to the trap jaws, (b) said second pin being operatively engaged with said second means for retracting the second pin in unison with said first pin to permit installation and removal of the safety device.

13. The safety device of claim 12, wherein (a) said first means includes a third pin movably positioned in said body portion and extending downwardly from the bottom wall of said body portion and through one of said members, (b) said third pin being operatively engaged with said second means for retracting said third pin in unison with said first and second pins, (c) said third pin being provided with locking means engageable with a trap jaw when it is accidentally sprung, to prevent removal of the device from the sprung trap.

14. The safety device of claim 13 wherein (a) said third pin locking means comprises a peripheral recess in the third pin into which the jaw extends, thereby preventing vertical movement of said third pin.

15. The safety device of claim 10, wherein (a) said third means includes an elongated handle, and (b) a pin retracting assembly connected to the upper end of said handle and engaged with said pins, for retracting the pins in unison upon exertion of an upward force on the assembly.

16. The safety device of claim 15, wherein (a) said pin retracting assembly includes cable means in operative engagement with said pins, and (b) a finger-engaging member connected to the upper end of said cable means.

* * * * *